June 14, 1932.  C. B. THORNE  1,863,422
MEANS FOR SEPARATING PARTICLES FROM FREE WATER
Filed Oct. 15, 1928  3 Sheets-Sheet 1

INVENTOR
C. B. Thorne.
BY E. J. Featherstonhaugh
ATTORNEY

June 14, 1932. C. B. THORNE 1,863,422
MEANS FOR SEPARATING PARTICLES FROM FREE WATER
Filed Oct. 15, 1928 3 Sheets-Sheet 2

INVENTOR.
C. B. Thorne.
BY E.J. Featherstonhaugh
ATTORNEY.

June 14, 1932. C. B. THORNE 1,863,422
MEANS FOR SEPARATING PARTICLES FROM FREE WATER
Filed Oct. 15, 1928  3 Sheets-Sheet 3

INVENTOR
C. B. Thorne.
BY E. J. Featherstonhaugh
ATTORNEY.

Patented June 14, 1932

1,863,422

UNITED STATES PATENT OFFICE

CARL BUSCH THORNE, OF HAWKESBURY, ONTARIO, CANADA

MEANS FOR SEPARATING PARTICLES FROM FREE WATER

Application filed October 15, 1928. Serial No. 312,544.

The invention relates to means for separating particles from free water, as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to effect economy in pulp mills or other places by saving the fiber from the white water which ordinarily flows to the sewer, and to do this in such a manner as will insure the maxmum withdrawal of material from the water; to eliminate the use of vacuum or pressure means in the recovery of the material; to adjust the speed of the operation in accordance with the condition of the white water being treated and thereby secure the separation of minute pulp particles from the water; to maintain the operation of the separating devices at a low cost without in any way reducing their efficiency; to increase the output in pulp mills by eliminating the loss of fiber in the waste water; and generally to provide in the recovery apparatus economical and efficient means for separating the particles remaining in the water which is freed from the pulp during the pulp making process.

In the drawings, Figure 1 is a longitudinal sectional view of the complete machine, showing one screen in its lower position and the operating mechanism beyond the tank.

Figure 3 is an end elevational view of the machine showing the operating mechanism.

Like numerals of reference indicate corresponding parts in the various figures.

Figure 1:
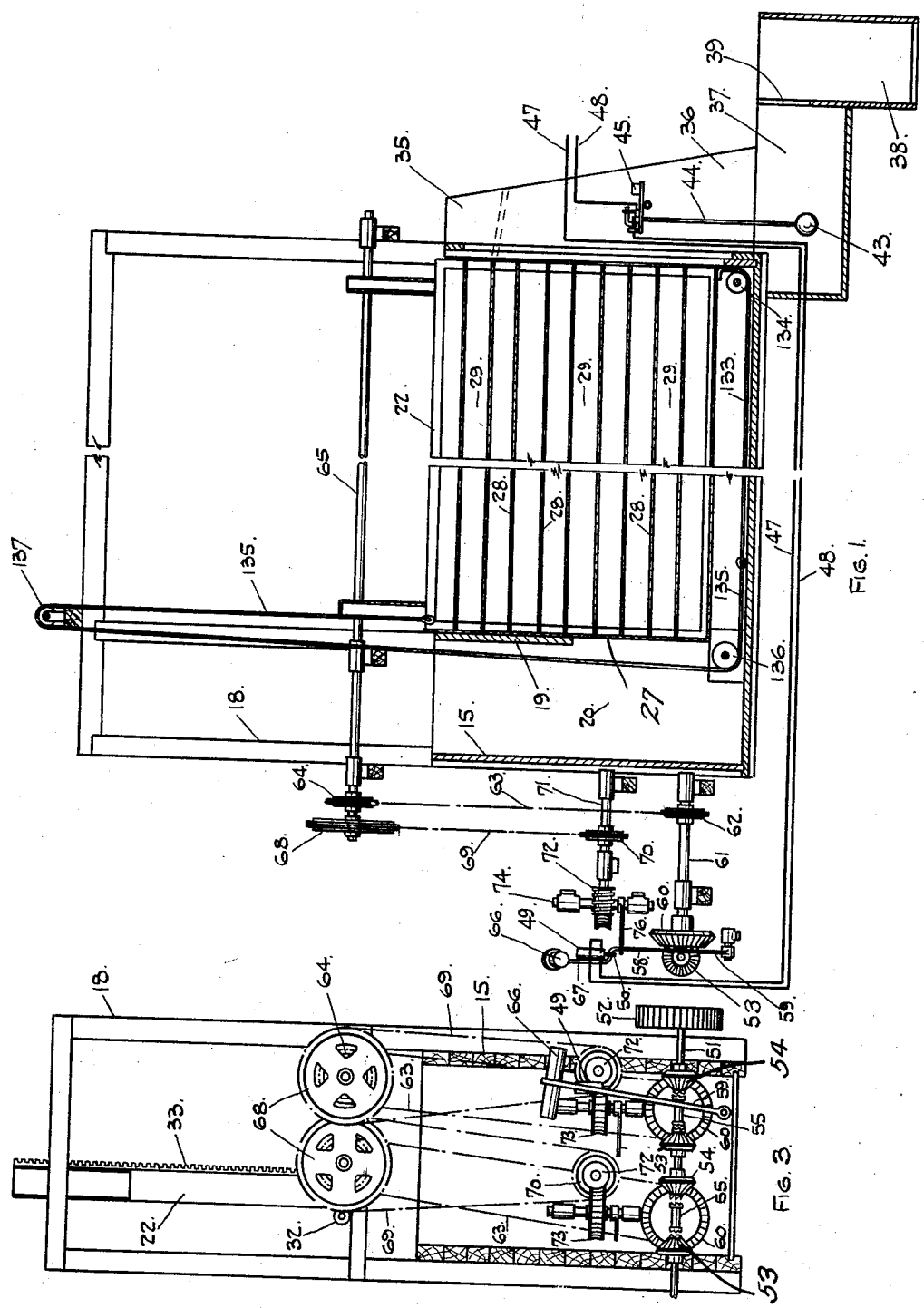
Figures 2, 4:
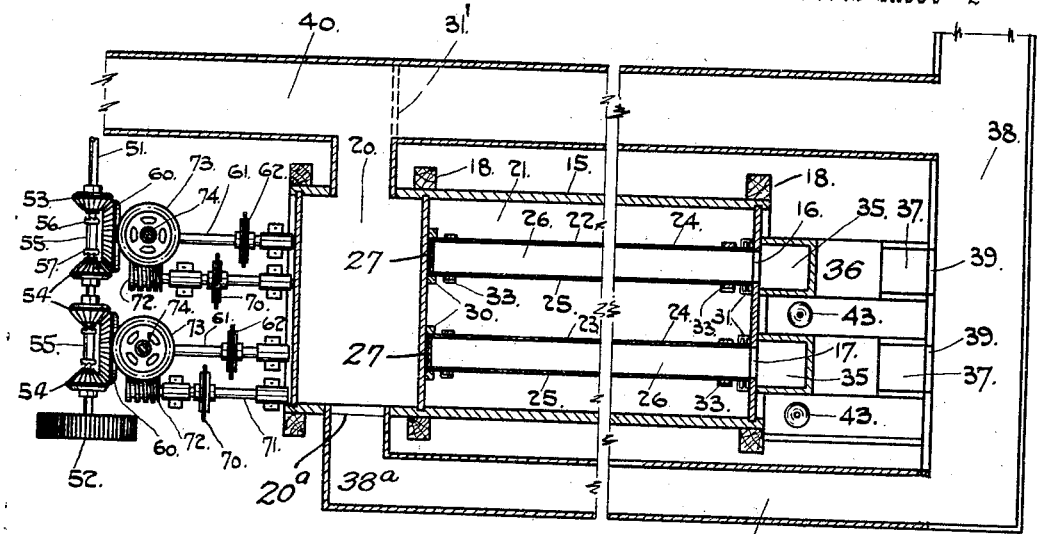
Figure 2 is a plan view partly in section of the complete machine.
Figure 4 is an end elevational view partially in section to disclose the weir boxes and floats.
Figure 5:
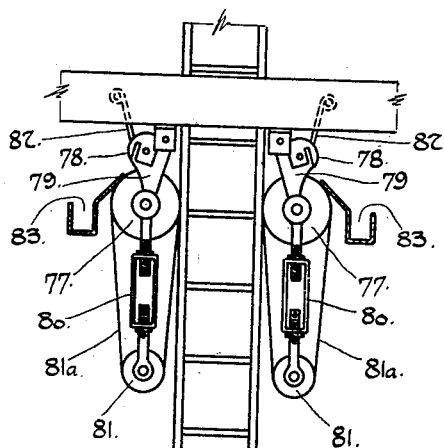
Figure 5 is an end elevational view showing one means for removing the fiber from the screen.
Figure 6:
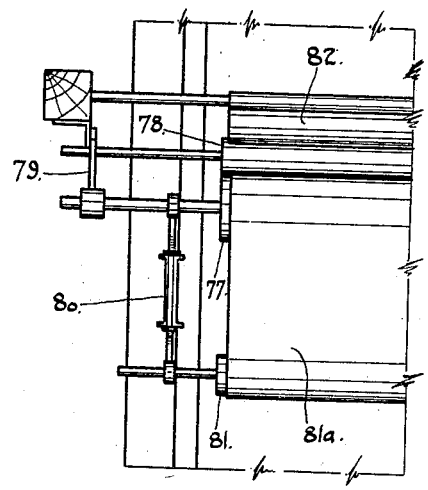
Figure 6 is a front elevational view of the means illustrated in Figure 5 broken away towards one end.

Referring to the drawings, the numeral 15 indicates the tank having through one end thereof the outlet openings 16 and 17, here shown as two outlets, though there may be as many as desired, according to the number of screens in the installation.

The frame 18 rises above the tank 15 and is rigid therewith. The baffle board or partition 19 extends across the tank 15 and extends downwardly for a portion of the height of the tank towards one end thereof, thereby indicating an inlet compartment 20, which freely communicates with the screen compartment 21 of the tank, the latter emptying through the outlets 16 and 17.

The screens 22 and 23 or as many more of them as may be in the installation, or less, if desired, are formed of wire mesh mounted on a wooden or metal frame, the construction of which is not a salient feature of this invention, it is only necessary to say that each complete screen comprises two wire mesh faces 24 and 25 separated to form the screen chambers 26, these screen chambers respectively emptying into the outlets 16 and 17 and registering therewith at their open ends.

The other ends 27 of the screens are closed, also these screen chambers 26 are closed at the bottom and at intervals in the height thereof.

The screen chambers 26 are longitudinally subdivided by the divisions 28 into the longitudinal passages 29, these divisions being imperforate, so that there is no communication therebetween except running through the wire mesh.

The screens are mounted in the slideways 30 on the baffle board 19 and the slideways 31 secured on the end wall of the tank on the inner side, consequently these screens are guided in their upward and downward movements and are further guided by the rollers 32 mounted in the frame 18 through which they project at their upper ends in their raised positions.

A belt 133 forms the closure for the outlet chambers 35 and 36 for each screen and is carried up by a screen 22 or 23 as the case may be. The belt for each screen installation is secured to the screen bottom and is trained over a roller 134 in the bottom of the tank under the end outlets and the weight of the water in the tank flattens the belt to the wall surrounding the outlet, thereby closing the discharge, while the screen is above the water level. A cable 135 is secured to the free end of the belt and is trained around a roller 137 secured to the top frame and fastened to the screen thus when a screen rises out of the tank it draws a belt with it to cover the entrance to the outlet chambers pertaining to that screen.

Each screen carries a rack 33, which is engaged by a pinion 34, and by this means the screens are raised or lowered according to the direction of rotation in which the particular pinion may be driven. It will thus be seen that when the inlet compartment 20 is connected to the supply, the whole tank fills, and as the screens guard the outlets 16 and 17, the white water must find its way through the screens to said outlets, consequently the water flowing through the screens deposits a quantity of pulp particles on said screens in passage, but in the usual run of recovery machines, considerable fiber or pulp particles are not recovered, simply because the water too freely passes through the interstices of the screen and therefore takes considerable time for the screen to reach a condition in which it is of service in blocking the passage of the smaller particles, therefore, the particular screens described herein are raised and lowered in a particular manner and provision made for the partial clogging of the screen interstices, before it reaches its position of greatest service, and for the first discharge of the white water used in this partial clogging process to be saved.

The outlet openings 16 and 17 empty into the upper outlet chamber 35 at the end of the tank 15, and the lower outlet chamber 36 at the end of the tank 15.

The lower outlet chamber 36 empties into the flow box 37 and from there into the sewer 38, through the outlet 39 from said flow box.

The sewer passage 38 may also be connected to the feed passage 40, though ordinarily cut off therefrom by the gate 31', so that the white water is directed into the inlet chamber 20. Therefore a screen on first dipping into the tank of white water will receive its first coating of particles and the water which flows freely therethrough will pass through the wire mesh into the particular subdivisions concerned and from there pass out into the outlet chamber 35 back to the original white water to be treated.

The passage 38a constitutes the overflow passage from the feed box 20 and this passage leads to the sewer 38, thus when the screens are not able to take care of all the white water fed in to the box 20, the overflow will pass over the feed box wall 20a into the passage 38a and on to the sewer.

As the screen descends further, the interstices of the wire meshes are partially clogged, so that the water passes less freely therethrough and continues to clog up the interstices to a greater extent as the screen descends and when the screen reaches the bottom it is held there for a while, so that the utmost penetration of water may be provided for, however, this water becomes less and less as the time goes on in the screen sub-divisions, therefore the flow box 37 gradually empties until there is very little in it, and at this period, the particular screen is ready for the raising operation, which will now be more fully described in respect to one screen and the same driving mechanism as used for the other.

The float 43 is introduced into the flow box 37 and the stem 44 thereof extends to an electrical switch 45, to close a circuit suitably energized and connected by the wires 47 and 48 to the solenoid coil 49.

The solenoid core 50 is drawn to its inner position on the dropping of the float 43 due to the emptying of the flow box.

The driving shaft 51 is mounted on suitable bearings and is driven through the pulley 52 or by any other convenient driving mechanism.

The opposing pinions 53 and 54 are loosely mounted on the shaft 51 and each have clutch teeth at the inner ends of the hubs.

The clutch member 55 is mounted by a feather on the shaft 51 and so rotates with the shaft but is free to slide on it.

The operating rod 58 is pivotally secured at its lower end 59, and is adapted to swing in engagement with the clutch member 55 between the flanges 56 and 57, so that when it swings in one direction it will engage the flange 56 and move the clutch member to the pinion 53, and when it swings in the other direction it will engage the flange 57 and move it to the pinion 54, thereby putting one or other of the pinions in its driving position as the case may be.

The pinions 53 and 54 mesh with the bevel gear 60 at opposite sides. This bevel gear 60 is mounted on the driven shaft 61 journalled in suitable bearings carrying at its other end the sprocket wheel 62, which is connected by the chain 63 to the upper sprocket wheel 64, mounted on the shaft 65, journalled in suitable bearings in the frame 18, and carrying the pinions 34 thereby affording a driving connection from the pulley 52 to the said driven pinions 34.

The operating rod 58 at the upper end carries the weight 66, and this upper end is offset at 67 so that it escapes the solenoid coil 49, while the solenoid core 50 is in a position to hold the operating rod from operation until the screen is perfectly clogged.

The shaft 65 also carries the driving sprocket 68 at its outer end, which is connected by the chain 69 to the sprocket 70, and this sprocket 70 is mounted on the worm shaft 71, journalled in suitable bearings and having the worm 72 coacting with the worm wheel 73, mounted on the vertical shaft 74, journalled in suitable bearings.

The vertical shaft 74 carries the arcual arms 76 embracing the operating rod 58, consequently one or other of these arms will move slowly in order to tilt the operating rod 58 in one direction or the other for the purpose of bringing into communication either the driving pinion for the raising of the screen or the driving pinion for the lowering of the screen.

The scraping or removing of the pulp from the screen may be done in any one of the ways described, the most customary way is by means of the rollers 77 and 81 over which an endless felt 81a is stretched, this felt being kept tight by the stretcher 80. The rolls 77 are journalled in the brackets 79 and these brackets 79 are so placed that there is a slight pressure of the rolls 77 against the wire surface of the screen.

The felts 81a come into contact with the screen and are rotated by friction against the screen and collect the fiber therefrom, in other words, they clean the screen of the fiber, and this fiber is picked up by the wooden rollers 78, which are journalled in the brackets 79, and which run free on the rolls 77, and the fiber is removed therefrom by the scrapers 82 and delivered in the trough 83.

Figure 7:
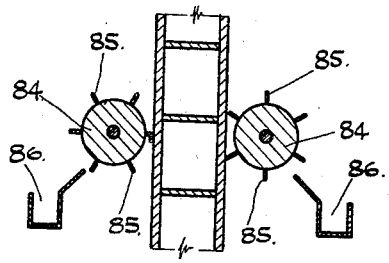
Figure 7 is an end elevational view of another means employed for removing the fiber from the screen, being a modification of the means employed in Figure 5.
Figure 8:
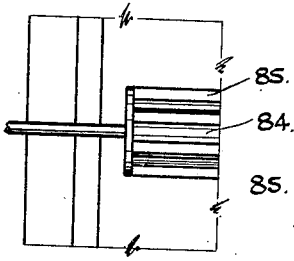
Figure 8 is a front elevational view broken away towards one end of the means illustrated in Figure 7.

In Figures 7 and 8 a slight difference in the scraping is done in this instance by the rollers 84, having elongated rubber teeth 85, which are brought into contact with the screen and deliver the fiber into the trough 86.

Figure 9:
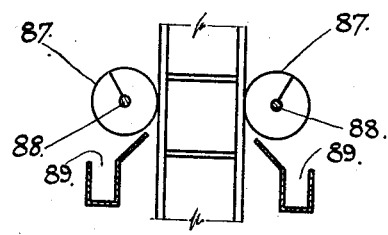
Figure 9 is an end elevational view of still another means for removing the fiber from the screen.
Figure 10:
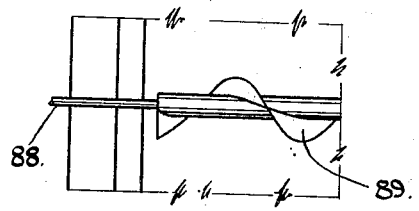
Figure 10 is a front elevational view broken away towards one end, of the means illustrated in Figure 9.

In Figures 9 and 10 the collecting is done by means of a rubber screw 87, and the driven shafts 88. The rubber screws come into contact with the screen and deliver the fiber into the troughs 89.

In the operation of this invention the white water is delivered into the tank through the feed passage and enters the inlet compartment and from there of course flows throughout the tank until the tank is filled, and taking the operation of one screen into consideration for the better understanding of the invention it may be stated that the screen is operated to descend from its upper position into the tank.

As before explained, this screen is divided into a plurality of longitudinal divisions, which only connect with one another from the outside, that is by the screen meshed wires, these divisions being completely opened at the outlet end and completely closed at the inlet end of the tank, therefore the only entrance is from either side through the screen, so that when the screen descends into the water there are only two divisions at a time which have an outlet into the upper outlet chamber, that is to say, all the white water which freely goes through in the divisions may return for further treatment until the screen is completely submerged.

This original dipping of the screen two by two effects a slight coating of the screen and the interstices are partially clogged, so that the particles of pulp will cling on to the fibrous material already coating the screen and naturally the more these interstices are clogged, the greater the tendency is for the tiniest fibers in the white water to cling to the fibers already on the screen.

The result of this is that the water which eventually finds its way into the flow box is almost clear water. The first discharge water which has gone to the upper outlet compartment may be used again or turned over into the general white water for further treatment.

The screen when it has descended to its lowermost position rests there a while for the better penetration of water, the greater clogging of the interstices, and the thicker coating of the wire meshes, and just as soon as this condition has been reached, the water has practically stopped flowing into the screen compartment, and the result of this is the emptying of the flow box. Just so soon as the flow box empties, the float drops and this closes the circuit including the solenoid coil, and on the energization of this coil, the core is drawn from engagement with the operating rod, leaving it free to tilt and in tilting draw the clutch member into engagement with the driving mechanism for raising the screen.

The driving pinion engages the coacting bevel gear, and this operates the chain and sprocket mechanism, which in turn operates the rack and pinion mechanism consequently the screen is raised gradually to its uppermost position.

Meanwhile the worm and worm wheel mechanism has been operating and the arcual arms have reached that stage in their movement, whereby one of said arms engages the operating rod to move it over for its tilt in the opposite direction.

There is nothing to stop it going over, for the flow box is still empty, and therefore the solenoid core is quite out of the way, consequently when the arcual arm engages the operating rod it slides the clutch member over to the reverse pinion and the screen begins to descend and when the screen has reached the bottom, the worm and worm wheel mechanism are naturally operating in the opposite direction and bringing the operating rod over, so that it may be in position to actuate the clutch for the raising movement, but in the meantime the water has begun to reach the flow box, therefore the float is raised and this opens the mercury electrical switch and allows the solenoid core to drop in the way of the operating rod, thus preventing the clutch being engaged on the opposite side, but also it leaves this operating rod over the centre so that when the solenoid is again energized by the action of the float the operation will be repeated.

The screen is now in its lowermost position and rests there, for the two driving pinions are idly moving on the shafts and all the driving mechanism is at rest as well as the screen and for further action must wait until the interstices of the wire meshes are so clogged up as to prevent the water flowing therethrough, thus again reducing the flow of water in the flow box to practically nothing, and consequently moving the float to its lowermost position and operating the mercury electrical switch, so that the core of the solenoid is again drawn out of the way of the operating rod and this rod completes its tilting movement and moves the clutch member into engagement with the driving pinion for the raising movement.

The cleaning of the screens has been sufficiently described in the explanation of the several forms of mechanism suitable for that work and while there are certain novel features in each one of the several forms the principal parts thereof are well enough known in the art to justify the assumption that there will be no difficulty in the use thereof, as to the removal of collected and separated pulp fiber.

What I claim is:—

1. In means for separating particles from free water, a tank containing the liquid, a discharge receptacle communicating with said tank towards the upper end, a discharge receptacle communicating with said tank towards and at the lower end, a reciprocatory screen immersed and withdrawn from said tank in successive movements and having horizontal outlet passages between sieve walls open at one end and closed at the other end and directing the residual liquid in sequent discharges into said receptacles respectively, means for supporting said screen, means for reciprocating said screen and a closure operating with said screen to shut off said receptacles on the withdrawal of the screen.

2. In means for separating particles from free water, a tank containing the liquid, a discharge receptacle communicating with said tank towards the upper end, a discharge receptacle communicating with said tank towards and at the lower end, a reciprocatory screen having a solid bottom and end wall, a frame at the other open end and top supporting solid horizontal partitions at intervals and sieve walls and forming passages leading to said open end, a slideway for said screen within said tank, means for supporting said screen above said tank, means for reciprocating said screen into and out of said tank and a closure operating with said screen to shut off said receptacles on the withdrawal of the screen.

3. In means for separating particles from free water, a tank containing the liquid, a discharge receptacle communicating with said tank towards the upper end, a discharge receptacle communicating with said tank towards and at the lower end, a reciprocatory screen immersed and withdrawn from said tank in successive movements and having horizontal outlet passages between sieve walls open at one end and closed at the other end and registering with said receptacles successively, means for operating said screen in continuous downward movements and in continuous upward movements, means for arresting said screen preceding the upward stroke governed by the closing of said passages with collected particles and a closure operating with said screen to shut off said receptacle on the withdrawal of the screen.

4. In means for separating particles from free water, a tank containing the liquid having upper and lower outlets through the wall thereof, a discharge receptacle communicating with the said upper outlet, a discharge receptacle communicating with the said lower outlet, a reciprocatory screen immersed and withdrawn from said tank in successive movements and having horizontal outlet passages between sieve walls open at one end and closed at the other end and emptying through said outlets into said receptacles in turn, a frame extending upwardly from the tank, a closure operating with said screen to shut off said receptacles on the withdrawal of the screen, and operating means having lifting and lowering mechanism automatically clutched and declutched for the lowering and raising of the screen.

5. In means for separating particles from free water, a tank containing the liquid, a discharge receptacle communicating with said tank towards the upper end, a discharge receptacle communicating with said tank towards and at the lower end, a pair of reciprocatory screens immersed and withdrawn from said tank in successive movements and carrying rack members, coacting pinions suitably mounted on driven shafts, a driving mechanism including worm and worm wheel mechanism and connected to said driven shafts, clutch members automatically operable for downward and reverse screen movements and closures respectively secured to said screens and operating therewith to shut off said receptacles.

6. In means for separating particles from free water, a tank containing the liquid and having an outlet opening extending vertically from the bottom in one side, a flexible belt closure for said outlet having an operating cable attached thereto, a reciprocatory screen forming discharge passages for residual liquids and suitably lowered and raised in said tank and attached to said cable and drawing said belt to close said outlet, and upper and lower discharge receptacles covering in said outlet and communicating therewith in the lowered position of the screen.

Signed at Montreal, Canada, this 23rd day of August, 1928.

CARL BUSCH THORNE.